US007644035B1

(12) United States Patent
Biffle et al.

(10) Patent No.: US 7,644,035 B1
(45) Date of Patent: Jan. 5, 2010

(54) METHOD AND APPARATUS FOR REDUCING FRAUDULENT CREDIT TRANSACTIONS BY REQUIRING MERCHANT RETURN OF MULTI-DIGIT AUTHORIZATION CODES

(75) Inventors: Jan L. Biffle, Scottsdale, AZ (US); Sandeep K. Sacheti, Edison, NJ (US)

(73) Assignee: American Express Travel Related Services Company, Inc., New York, NY (US)

( * ) Notice: Subject to any disclaimer, the term of this patent is extended or adjusted under 35 U.S.C. 154(b) by 506 days.

(21) Appl. No.: 11/132,233

(22) Filed: May 19, 2005

Related U.S. Application Data

(60) Provisional application No. 60/572,585, filed on May 19, 2004.

(51) Int. Cl.
*G06Q 40/00* (2006.01)

(52) U.S. Cl. ........................................................ 705/39

(58) Field of Classification Search .................. 705/39, 705/40–42; 235/379–381
See application file for complete search history.

(56) References Cited

U.S. PATENT DOCUMENTS 5,334,823 A * 8/1994 Noblett et al. .............. 235/380
5,892,827 A * 4/1999 Beach et al. .................. 705/76
6,163,771 A * 12/2000 Walker et al. ................. 705/18
6,805,289 B2 * 10/2004 Noriega et al. .............. 235/380
6,882,984 B1 * 4/2005 Boyle et al. .................... 705/35
2001/0034702 A1 * 10/2001 Mockett et al. ............... 705/39
2001/0042785 A1 * 11/2001 Walker et al. ............... 235/379
2002/0107797 A1 * 8/2002 Combaluzier ................ 705/41

OTHER PUBLICATIONS

Evan Clark; "Chargeback Mania: Squeeze is on", WWD. New York Feb 11, 2004. vol. 187, Iss. 29; p. 16.*
Lauri Giesen; "The chargeback squeeze", Credit Card Management. New York Nov. 2003. vol. 16, Iss. 9; p. 26.*

* cited by examiner

*Primary Examiner*—Hani Kazimi
(74) *Attorney, Agent, or Firm*—Sterne, Kessler, Goldstein & Fox, PLLC.

(57) ABSTRACT

Processes for reducing fraudulent credit transactions, including financial (e.g., credit, charge, debit, etc.) card transactions, are introduced, in which merchants receive multi-digit authorization codes from a credit provider (e.g., a customer transaction account card user) with all approved transactions. To guarantee payment, all merchants are required to later resubmit the multi-digit authorization code with every record of charge, regardless of dollar amount, as verification that an authorization was obtained. Merchants that fail to provide any authorization code, or an incorrect authorization code, will be subject to a chargeback for non-compliance.

16 Claims, 2 Drawing Sheets

Figure 1:
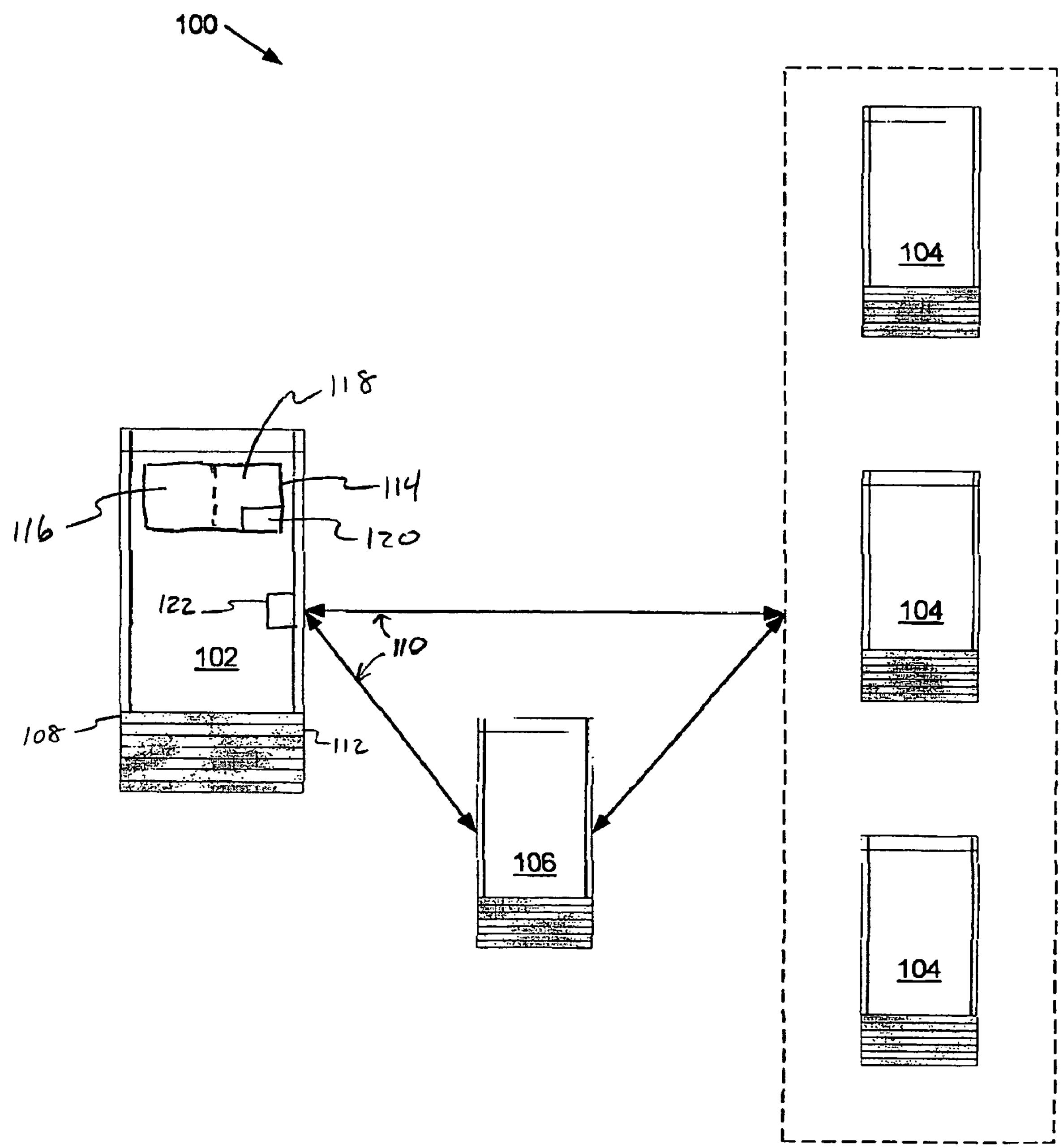

200
MERCHANT SUBMITS REQUEST FOR CREDIT CHARGE AGAINST A CUSTOMER ACCOUNT 202
CREDIT PROVIDER TRANSMITS APPROVAL AND AUTHORIZATION CODE 204
MERCHANT SUBMITS ROC TO PROVIDER FOR PAYMENT 206
IS AUTH. CODE INCLUDED? 208
N
FLAG MERCHANT ACCOUNT FOR POSSIBLE CHARGEBACK 210
Y
APPROVE MERCHANT PAYMENT 216
N
IS CHARGE DISPUTED? 212
ASSESS CHARGEBACK AGAINST MERCHANT 214
Y

METHOD AND APPARATUS FOR REDUCING FRAUDULENT CREDIT TRANSACTIONS BY REQUIRING MERCHANT RETURN OF MULTI-DIGIT AUTHORIZATION CODES

CROSS REFERENCE TO RELATED APPLICATIONS

This application claims the benefit of U.S. Provisional Application No. 60/572,585, filed May 19, 2004, which is hereby incorporated by reference herein in its entirety.

BACKGROUND OF THE INVENTION

1. Field of the Invention

This invention generally relates to data processing for business practices, and in particular it relates to financial transaction processing.

2. Background Art

Submission of fraudulent records of charge (ROCs) account for a significant proportion of the incidence of credit card transaction fraud. In order to combat this, credit providers (such as credit card issuers) have been seeking to implement processes by which false submissions of ROCs are reduced, without unduly impacting the time it takes to authorize a legitimate credit transaction.

One known solution, implemented by certain credit providers such as American Express Co. of New York, N.Y., involves generating a two-digit authorization code for each credit transaction, that can be transmitted with a credit approval. The authorization code could then be stored by the credit provider and referenced in the case of a charge dispute or the like. However, there are various limitations to the protection afforded by such a method.

First, the two-digit codes in such systems only include a limited range of possible character strings. In the context of the hundreds of millions of credit transactions that are conducted annually, these limited number of codes will be repeated often, making it easier to fake or forge a two-digit approval in connection with fraudulent ROCs.

Second, the determination of fraudulent charge submissions is limited and credit dispute resolution is continuously delayed by the time it takes for a credit provider to retrieve authorization code information from its records and determine a transaction's authenticity.

Finally, not all merchants in today's transaction networks are equipped to receive and resubmit authorization codes. In early 2003, over 11% of U.S. credit transactions were submitted for payment without a valid authorization code. This gap leaves credit providers open to further fraudulent charge submissions.

It would be possible for a credit provider to simply reject any merchant request for payment up front when it is submitted without the authorization code. However, a significant proportion of charge volume could needlessly be lost since the majority of such submissions are legitimate. This, in turn, could negatively impact a credit provider's revenues. Accordingly, there is a need for a method and apparatus for reducing fraudulent credit transactions that addresses the above-described problems and short-comings in existing methodologies.

BRIEF SUMMARY OF THE INVENTION

Fraudulent credit transactions may be reduced by requiring merchant return of multi-digit authorization codes. In particular, one aspect of the disclosure includes a merchant payment process by which a merchant completes a credit transaction with a customer. The merchant transmits a credit transaction request, including a transaction amount and an identification of a customer's credit account, to the credit provider maintaining the customer's credit account. The credit provider responds with an approval for the credit transaction when the customer's credit account is in good standing. The approval includes a multi-digit authorization code (e.g., a six-digit alphanumeric code). When the merchant later submits a request for payment for the approved credit transaction request, the merchant may be flagged as subject to a chargeback if the received request does not include the multi-digit authorization code as provided with the approval, as lack of a proper authorization code may be evidence of a fraudulent charge. In addition, a dispute of the credit transaction subsequently received from a customer associated with the credit account may be seen as further evidence of a fraudulent charge. Therefore, if a credit transaction involving a flagged merchant is disputed by the customer associated with the credit account at issue, a chargeback may be assessed against the merchant by the credit provider.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 2:
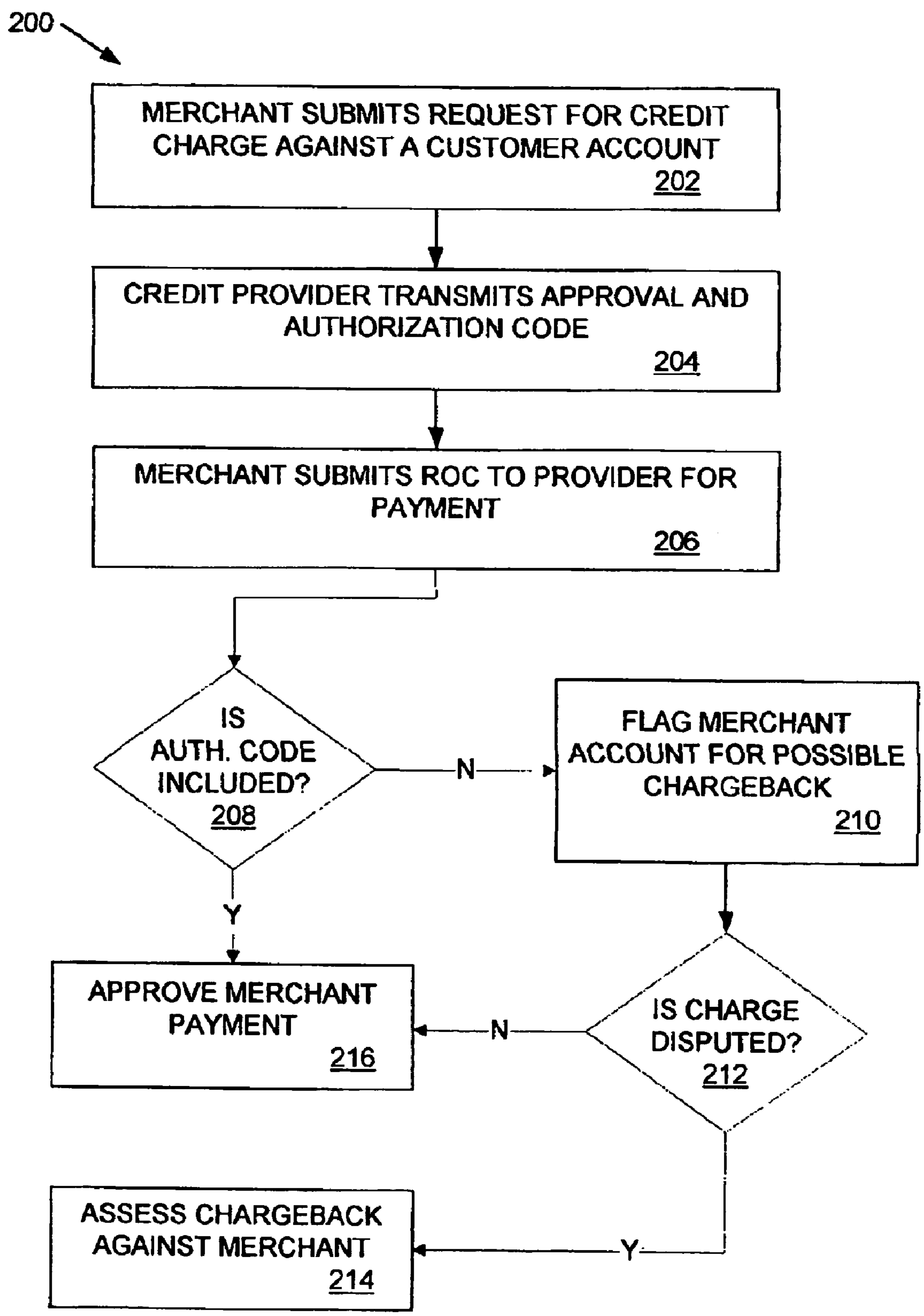

FIG. 1 is a schematic diagram of an exemplary communication network over which the processes of the present disclosure may be performed; and FIG. 2 is a flow chart depicting an exemplary merchant payment process according to the present disclosure.

The present invention will be described with reference to the accompanying drawings. The drawing in which an element first appears is typically indicated by the leftmost digit(s) in the corresponding reference number.

DETAILED DESCRIPTION OF THE INVENTION

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

The terms "merchant" as used herein shall mean any person, entity, distributor system, software, and/or hardware that is a provider, broker, and/or any other entity in the distribution chain of goods or services. For example, a merchant may be a grocery store, a retail store, a travel agency, a service provider, an online merchant, or the like.

Referring now to FIGS. 1-2, wherein similar components of the present disclosure are referenced in like manner, various embodiments of a method and system for reducing fraudulent credit transactions are disclosed, in which merchants are required to return multi-digit authorization codes supplied by credit providers (e.g., issuers) with credit transaction approvals.

A goal of the processes disclosed herein is to more readily assess chargebacks to merchants for unpaid transactions (once merchants are properly notified of the requirement) in order to encourage the submission of authorization codes with all merchant payment requests, thereby reducing the possibility of successful attempts to submit fraudulent ROCs. This simplifies prior processes, in which unpaid or disputed ROCs were evaluated according to certain standards, such as threshold transaction amounts, chargeback time-frames, or first-in-first-out processes, before chargebacks could be assessed, thus increasing the costs associated with resolving unpaid credit transactions.

The processes disclosed herein decrease such costs by providing longer authorization codes that are more difficult to forge. Such authorization codes may also be confirmed from the submission of ROCs themselves, thus reducing time to recall and verify stored records. If the submitted authorization code is blank, all zeros, any combination other than the prescribed number of digits, or includes one or more invalid characters, the merchant is flagged immediately upon submission as liable for chargeback. This has the benefit of automating the chargeback process and assessing chargeback fees more expediently, when submitted transactions are disputed or otherwise remain unpaid. This, in turn, should encourage merchants to more readily comply with the authorization code scheme.

The present invention or any part(s) or function(s) thereof may be implemented using hardware, software, or a combination thereof and may be implemented in one or more computer systems or other processing systems. No capability of a human operator is necessary, or desirable in most cases, in any of the operations described herein which form part of the present invention. Rather, the operations are machine operations. Useful machines for performing the operation of the present invention include general purpose digital computers or similar devices.

Turning now to FIG. 1, there is depicted an exemplary communication network 100, over which the processes of the present disclosure may be performed. The network 100 may be any known type of financial transaction network over which today's credit transactions are currently implemented. Such systems typically include a credit provider's server 102 that intercommunicates financial transaction and related data with a plurality of merchant servers 104, either directly or through a third party payment processing server 106. Merchant servers 104 and third party payment processing server 106 include similar components as credit provider's server 102, as described below.

Credit provider's server 102 includes one or more processors, such as processor 108. The processor 108 is connected to a communications infrastructure 110 (e.g., a communications bus, cross-over bar, or network). Various software embodiments are described in terms of this exemplary communication network. After reading this description, it will become apparent to a person skilled in the relevant art(s) how to implement the invention using other computer systems and/or architectures.

Server 102 also includes a main memory 112, such as random access memory (RAM), and may also include a secondary memory 114. Secondary memory 114 may include, for example, a hard disk drive 116 and/or a removable storage drive 118, such as and without limitation, a floppy disk drive, a magnetic tape drive, or an optical disk drive. Removable storage drive 118 reads from and/or writes to a removable storage unit 120 in a well known manner.

Removable storage unit 120 may be, for example and without limitation, a floppy disk, magnetic tape, or an optical disk, which is read by and written to removable storage drive 118. As will be appreciated, removable storage unit 120 includes a computer usable storage medium having stored therein computer software and/or data.

In alternative embodiments, secondary memory 114 may include other similar devices for allowing computer programs or other instructions to be loaded onto server 102. Such devices may include, for example and without limitation, a removable storage unit and an interface. Examples of such include a program cartridge and cartridge interface, a removable memory chip (such as an erasable programmable read only memory (EPROM), or programmable read only memory (PROM)) and associated socket, and other removable storage units and interfaces which allow software and data to be transferred from the removable storage unit to server 102.

Server 102 may also include a communications interface 122. Communications interface 122 allows software and data to be transferred between server 102 and external devices, such as servers 104 and/or 106. Examples of communications interface 122 may include a modem, a network interface (such as an Ethernet card), a communications port, a Personal Computer Memory Card International Association (PCMCIA) slot and card, etc. Software and data transferred via communications interface 122 are in the form of signals which may be electronic, electromagnetic, optical, or other signals capable of being received by communications interface 122. These signals are provided to communications interface 122 over communication infrastructure 110. Communications infrastructure 110 may be implemented using wire or cable, fiber optics, a telephone line, a cellular link, a radio frequency (RF) link, and/or other communications channels. Alternatively, communications infrastructure 110 may be a wireless communications infrastructure.

In this document, the terms "computer program medium" and "computer usable medium" are used to generally refer to media such as removable storage unit 120, a hard disk installed in hard disk drive 116, removable memory chips, cartridges and the like, and the signals sent over communications interface 110. These computer program products provide software to server 102.

Computer programs (also referred to as computer control logic) are stored in main memory 112 and/or secondary memory 114. Computer programs may also be received via communications interface 122. Such computer programs, when executed, enable server 102 to perform the features of the present invention, as discussed herein. In particular, the computer programs, when executed, enable the processor 108 to perform the features of the present invention. Accordingly, such computer programs represent controllers of server 102.

In an embodiment where the invention is implemented using software, the software may be stored in a computer program product and loaded onto server 102 using, for example, removable storage drive 118, hard drive 116, or communications interface 122. The control logic, when executed by processor 108, causes processor 108 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

Referring to FIG. 2, therein is depicted an exemplary merchant payment process 200 performed between a merchant and a credit card provider over the communications network

100 of FIG. 1. Process 200 commences after a customer enters into a financial transaction, such as a credit card payment transaction, with a merchant.

With regard to use of a credit account, users may communicate with merchants in person (e.g., at the box office), telephonically, or electronically (e.g., from a user computer via the Internet). During the interaction, the merchant may offer goods and/or services to the user. The merchant may also offer the user the option of paying for the goods and/or services using any number of available credit accounts. Furthermore, the credit accounts may be used by the merchant as a form of identification of the user. The merchant may have a computing unit implemented in the form of a computer-server, although other implementations are possible.

In general, credit accounts may be used for transactions between the user and merchant through any suitable communication means, such as, for example, a telephone network, intranet, the global, public Internet, a point of interaction device (e.g., a point of sale (POS) device, personal digital assistant (PDA), mobile telephone, kiosk, etc.), online communications, off-line communications, wireless communications, and/or the like.

The merchant initially, in step 202, submits a request for approval of the credit transaction. Such request may be transmitted, for example, from one of merchant servers 104 to credit provider's server 102.

Next, at step 204, the credit provider that maintains the customer's credit account may provide an approval of the requested transaction in response to the merchant's request. The approval may be provided when the customer's account is in good standing, and the submitted request includes known, standard transaction information needed to approve the request. Such standard transaction information may include, for example and without limitation, the transaction amount and a proper identification of the customer's credit account. An "account" or "account number", as used herein, may include any device, code, number, letter, symbol, digital certificate, smart chip, digital signal, analog signal, biometric or other identifier/indicia suitably configured to allow a consumer to access, interact with, or communicate with a financial transaction system. The account number may optionally be located on or associated with any financial transaction instrument (e.g., rewards, charge, credit, debit, prepaid, telephone, embossed, smart, magnetic stripe, bar code, transponder, or radio frequency card).

The approval further includes an authorization code that is generated, for example, by the credit provider server 102 or by the third-party payment processing server 106. In order to minimize the possibility of successfully submitting fraudulent authorization codes with ROCs, it is preferred that the authorization code be at least three digits, and preferably be six digits or more, in order to reduce the number of times such codes are repeated in annual credit transactions. With a six-digit authorization code having only numeric characters, for example, a million credit transactions may be processed without repeating any codes. However, a person of skill in the pertinent art will recognize that the authorization code may include alphabetic, alphanumeric, or other types of characters as well.

The authorization code may be generated randomly with each transaction and stored for later reference. Alternatively, the authorization code may include encrypted information that may be decoded to reveal information that correlates to the customer account, for more ready verification. Such encryption may be carried out in any of a variety of well-known manners, and the customer account information that is encrypted may be varied from transaction to transaction, in order to decrease the likelihood of successful fraudulent submissions of authorization codes.

Next, at step 206 of process 200, the merchant submits an ROC to the credit provider for payment. The ROC may or may not include a valid authorization code. This may occur at any time after the customer has completed the initial transaction. The ROC for a particular transaction may be submitted alone or with ROCs from a number of other transactions.

In step 208, the credit provider then determines whether a valid authorization code has been submitted by the merchant. If so, process 200 continues to step 216 below. Otherwise, process 200 continues to step 210.

In step 210, the submitted transaction and/or the merchant is flagged immediately for possible chargeback. For example, the merchant may be given a chargeback status based on receipt of the valid authorization code.

Next, at step 212, the credit provider monitors whether the submitted credit transaction is disputed or is otherwise unpaid by the customer. The monitoring may occur during a certain threshold time interval (e.g., 30 days). If, during the certain threshold time interval, there is a dispute of the transaction or the transaction is otherwise identified as fraudulent, process 200 may proceed immediately to step 214. In step 214, a chargeback fee is assessed against the merchant for the submitted transaction.

In step 216, the merchant is provided with the requested payment. Step 216 occurs if a valid authorization code is included with the transmitted ROC from step 206. Step 216 also occurs if no disputes arise after the threshold time interval or if the transaction is paid by the customer.

After step 214 or step 216, process 200 ends with respect to that transaction.

Implementation of a process similar to process 200 above by a credit provider may result in an immediate increase in merchant chargeback fees related to non-compliance. However, over time, merchant compliance should dramatically increase, thus making the financial processing system more secure.

Although the best methodologies of the invention have been particularly described in the foregoing disclosure, it is to be understood that such descriptions have been provided for purposes of illustration only. For example, although the above description speaks of credit card accounts, it will be understood by those in the relevant art(s) that the present invention may be implemented in conjunction with any transaction account. A "transaction account" as used herein refers to an account associated with an open account or a closed account system. The transaction account may exist in a physical or non-physical embodiment. For example, a transaction account may be distributed in non-physical embodiments such as an account number, frequent-flyer account, telephone calling account or the like. Furthermore, a physical embodiment of a transaction account may be distributed as a financial instrument.

A financial transaction instrument may be traditional plastic transaction cards, titanium-containing, or metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A financial transaction instrument may also have electronic functionality provided by a network of electronic circuitry that is printed or otherwise incorporated onto or within the transaction instrument (and typically referred to as a "smart card"), or be a fob having a transponder and an RFID reader.

Thus, other variations both in form and in detail can be made thereupon by those skilled in the art without departing from the spirit and scope of the present invention, which is defined first and foremost by the appended claims.

What is claimed is:

1. A computer-implemented method for reducing fraudulent credit transactions, comprising:

receiving, from a merchant, a credit transaction request including a payment amount and an identification of a customer transaction account;

transmitting, to the merchant, an authorization for the credit transaction request when the customer transaction account is in good standing, wherein the authorization includes an encrypted multi-digit authorization code, wherein the encrypted multi-digit authorization code comprises information correlating to the customer transaction account;

receiving, from the merchant, the encrypted multi-digit authorization code and a request for payment for the credit transaction request;

determining via the computer a chargeback status of the merchant based upon at least the encrypted multi-digit authorization code, flagging via the computer the merchant for a possible chargeback when the encrypted multi-digit authorization code is invalid, and automatically charging back the credit transaction associated with the flagged merchant by monitoring for when a dispute occurs or there is non-payment by the customer within a threshold time interval.

2. The method of claim 1, further comprising:

authorizing a payment to the merchant for the credit transaction when the credit transaction is not disputed by a customer associated with the customer transaction account.

3. The method of claim 1, wherein the encrypted multi-digit authorization code includes at least two characters selected from the group consisting of alphabetical and numeric characters.

4. The method of claim 1, wherein the encrypted multi-digit authorization code includes at least three characters.

5. The method of claim 1, wherein the encrypted multi-digit authorization code includes at least six characters.

6. An apparatus for reducing fraudulent credit transactions, comprising:

a processor; and a memory in communication with the processor, the memory storing a plurality of processing instructions enabling the processor to:

receive, from a merchant, a credit transaction request including a payment amount and an identification of a customer transaction account;

transmit, to the merchant, an authorization for the credit transaction request when the customer transaction account is in good standing, wherein the authorization includes an encrypted multi-digit authorization code, wherein the encrypted multi-digit authorization code comprises information correlating to the customer transaction account;

receive, from the merchant, the encrypted multi-digit authorization code and a request for payment for the credit transaction request;

determine a chargeback status of the merchant based upon at least the encrypted multi-digit authorization code, flag the merchant for a possible chargeback when the encrypted multi-digit authorization code is invalid, and automatically charge back the credit transaction associated with the flagged merchant by monitoring for when a dispute occurs or there is non-payment by the customer within a threshold time interval.

7. The apparatus of claim 6, wherein the plurality of processing instructions further enables the processor to:

authorize a payment to the merchant for the credit transaction when the credit transaction is not disputed by a customer associated with the customer transaction account.

8. The apparatus of claim 6, wherein the encrypted multi-digit authorization code includes at least two characters selected from the group consisting of alphabetical and numeric characters.

9. The apparatus of claim 6, wherein the encrypted multi-digit authorization code includes at least three characters.

10. The apparatus of claim 6, wherein the encrypted multi-digit authorization code includes at least six characters.

11. A computer readable medium having control logic stored therein for causing a computer to reduce fraudulent credit transactions, when executed by the computer comprising the steps of:

receive, from a merchant, a credit transaction request including a payment amount and an identification of a customer transaction account;

transmit, to the merchant, an authorization for the credit transaction request when the customer transaction account is in good standing, wherein the authorization includes an encrypted multi-digit authorization code, wherein the encrypted multi-digit authorization code comprises information correlating to the customer transaction account;

receive, from the merchant, the encrypted multi-digit authorization code and a request for payment for the credit transaction request;

determine a chargeback status of the merchant based upon at least the encrypted multi-digit authorization code, flag the merchant for a possible charge back when the encrypted multi-digit authorization code is invalid, and charge back the credit transaction associated with the invalid encrypted multi-digit authorization code by monitoring for when a dispute occurs or there is non-payment by the customer within a threshold time interval.

12. The computer program product of claim 11, wherein the control logic further comprises:

providing a payment to the merchant for the credit transaction when the credit transaction is not disputed by a customer associated with the customer transaction account.

13. The computer program product of claim 11, wherein the encrypted multi-digit authorization code includes at least two characters selected from the group consisting of alphabetical and numeric characters.

14. The computer program product of claim 11, wherein the encrypted multi-digit authorization code includes at least three characters.

15. The computer program product of claim 11, wherein the encrypted multi-digit authorization code includes at least six characters.

16. A computer-readable medium containing instructions that, when executed by a processor, causes the processor to:

receive, from a merchant, a credit transaction request including a payment amount and an identification of a customer transaction account;

transmit to the merchant, an authorization for the credit transaction request when the customer transaction account is in good standing, wherein the authorization includes an encrypted multi-digit authorization code, wherein the encrypted multi-digit authorization code comprises information correlating to the customer transaction account;

receive, from the merchant, the encrypted multi-digit authorization code and a request for payment for the credit transaction request; and determine a chargeback status of the merchant based upon at least the encrypted multi-digit authorization code, flag the merchant for a possible chargeback when the encrypted multi-digit authorization code is invalid, and automatically charge back the credit transaction associated with the flagged merchant by monitoring for when a dispute occurs or there is non-payment by the customer within a threshold time interval.

* * * * *